US010032580B1

(12) United States Patent
Lai et al.

(10) Patent No.: US 10,032,580 B1
(45) Date of Patent: Jul. 24, 2018

(54) INPUT DEVICE HAVING ROTATABLE DISK

(71) Applicant: HON HAI PRECISION INDUSTRY CO., LTD., New Taipei (TW)

(72) Inventors: Chun-Hung Lai, New Taipei (TW); Chih-Chun Chang, New Taipei (TW); Ming-Yi Liu, New Taipei (TW); Wei-Ting Chien, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/615,315

(22) Filed: Jun. 6, 2017

(30) Foreign Application Priority Data

Apr. 28, 2017 (TW) .............................. 106114381 A

(51) Int. Cl.
*G06F 3/0338* (2013.01)
*H01H 25/04* (2006.01)
*H01H 25/06* (2006.01)
*H01H 19/11* (2006.01)
*H01H 19/04* (2006.01)

(52) U.S. Cl.
CPC .......... *H01H 25/041* (2013.01); *H01H 19/04* (2013.01); *H01H 19/11* (2013.01); *H01H 25/065* (2013.01); *H01H 2025/043* (2013.01); *H01H 2025/045* (2013.01); *H01H 2231/032* (2013.01)

(58) Field of Classification Search
CPC ...................................................... G06F 3/0362
USPC ............................................................. 345/184
See application file for complete search history.

(56) References Cited

U.S. PATENT DOCUMENTS

2004/0222977 A1* 11/2004 Bear ..................... G06F 11/328
345/184
2009/0085875 A1* 4/2009 Inoue .................... G06F 3/0236
345/171

FOREIGN PATENT DOCUMENTS

CN          1627764 A    6/2005
CN        103858088 A    6/2014

* cited by examiner

*Primary Examiner* — Kevin Kim
(74) *Attorney, Agent, or Firm* — ScienBiziP, P.C.

(57) ABSTRACT

A device for inputting commands includes a casing, a rotatable disk, and a processor. The rotatable disk can rotate relative to the casing, and has a plurality of input modes. The rotatable disk includes a switch button for switching among the input modes. The rotatable disk further includes a pointer. The casing includes an annular area surrounding the rotatable disk. The annular area has a plurality of input positions. The input positions correspond to characters of one character set corresponding to the current input mode. The processor is received in the casing, and can generate a command or control signal according to a character corresponding to an input position when the pointer is aligned with the input position.

11 Claims, 5 Drawing Sheets

INPUT DEVICE HAVING ROTATABLE DISK

FIELD

The subject matter herein generally relates to input devices, and more particularly, to an input device having a rotatable disk.

BACKGROUND

Input devices, such as remote controls, usually have a number of mechanical buttons. The mechanical buttons can generate control commands for controlling the input devices to perform functions when being operated. Increasing the number of the mechanical buttons can perfect the functions of the input device, but may also increase the size and affect the appearance of the input device.

BRIEF DESCRIPTION OF THE DRAWINGS

Implementations of the present technology will now be described, by way of example only, with reference to the attached figures.

DETAILED DESCRIPTION

Figure 1:
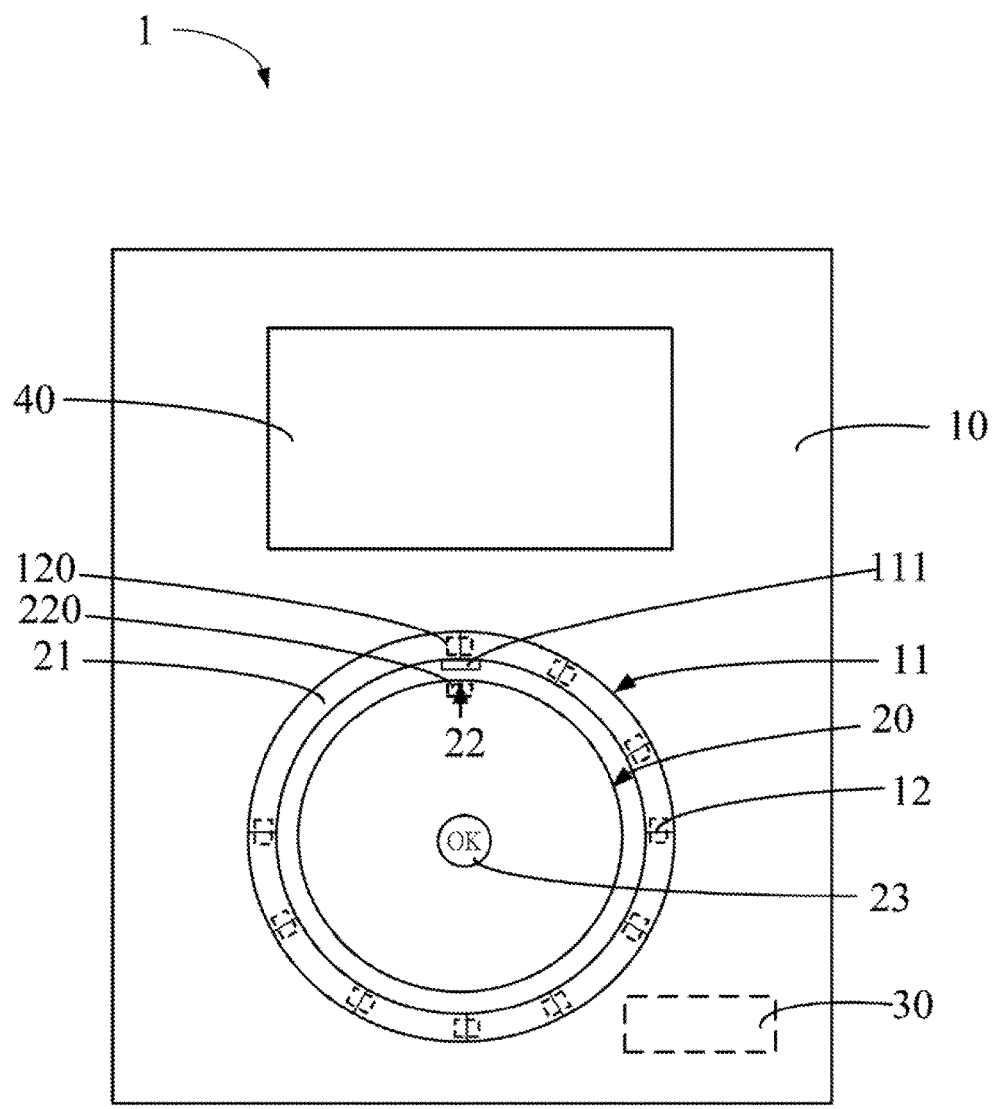
FIG. 1 is a diagrammatic view of an exemplary embodiment of an input device having a rotatable disk.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an exemplary embodiment of an input device 1. The input device 1 comprises a casing 10, a rotatable disk 20 capable of rotating relative to the casing 10, and a processor 30 received in the casing 10. In at least one exemplary embodiment, the input device 1 is a remote control. The rotatable disk 20 is substantially circular, and can rotate relative to the casing 10 clockwise and/or counterclockwise.

The rotatable disk 20 has a number of input modes. Each input mode is for a user to input characters of a character set. The characters can be numbers, capital letters, lowercase letters, and symbols. The rotatable disk 20 comprises a switch button 21 for switching the rotatable disk 20 among the input modes. The rotatable disk 20 comprises a pointer 22 positioned adjacent to the peripheral edge of the rotatable disk 20.

The casing 10 comprises an annular area 11 which surrounds the rotatable disk 20. The annular area 11 comprises a number of input positions 12 along a circumferential direction thereof, and an elastic tab 111. The input positions 12 are spaced from each other, and correspond to a number of characters of a character set corresponding to a current input mode of the rotatable disk 20. When the user wants to input a desired character of the character set corresponding to the current input mode, the user can first rotate the rotatable disk 20 along the clockwise direction or the counterclockwise direction, until the pointer 22 is aligned with the input position 12 corresponding to the desired character.

When the pointer 22 is aligned with one input position 12, the processor 30 generates a control signal according to a character corresponding to the input position 12.

In at least one exemplary embodiment, the rotatable disk 20 comprises a first capacitor plate 220 at the pointer 22. The annular area 11 comprises a second capacitor plate 120 at each input position 12. Each time the pointer 22 is aligned with one input position 12, the first capacitor plate 220 and the second capacitor plate 120 cooperatively generate a capacitance having a certain capacitance value. Each input position 12 corresponds to a particular capacitance value. When the processor 30 detects a capacitance value, the processor 30 can determine which input position 12 is aligned with the pointer 22 according to the detected capacitance value.

Furthermore, when the user rotates the rotatable disk 20 until the pointer 22 is aligned with the input position 12 corresponding to the desired character, the user can further press the pointer 22 to cause the rotatable disk 20 to send a confirm signal to the processor 30. The processor 30 generates the control signal when receiving the confirm signal from the rotatable disk 20. In at least one exemplary embodiment, the rotatable disk 20 comprises a touch sensitive screen for the user to press the pointer 22. In another exemplary embodiment, when the user rotates the rotatable disk 20 until the pointer 22 is aligned with the input position 12 corresponding to the desired character, the user can further release the rotatable disk 20 to cause the rotatable disk 20 to send the confirm signal to the processor 30. The pointer 22 returns to its original position which causes the capacitance value between the first capacitor plate 220 and the second capacitor plate 120 to decrease to zero. Thus, when the processor 30 detects the capacitance value decreasing to zero, the processor 30 generates the control signal.

Figure 2:
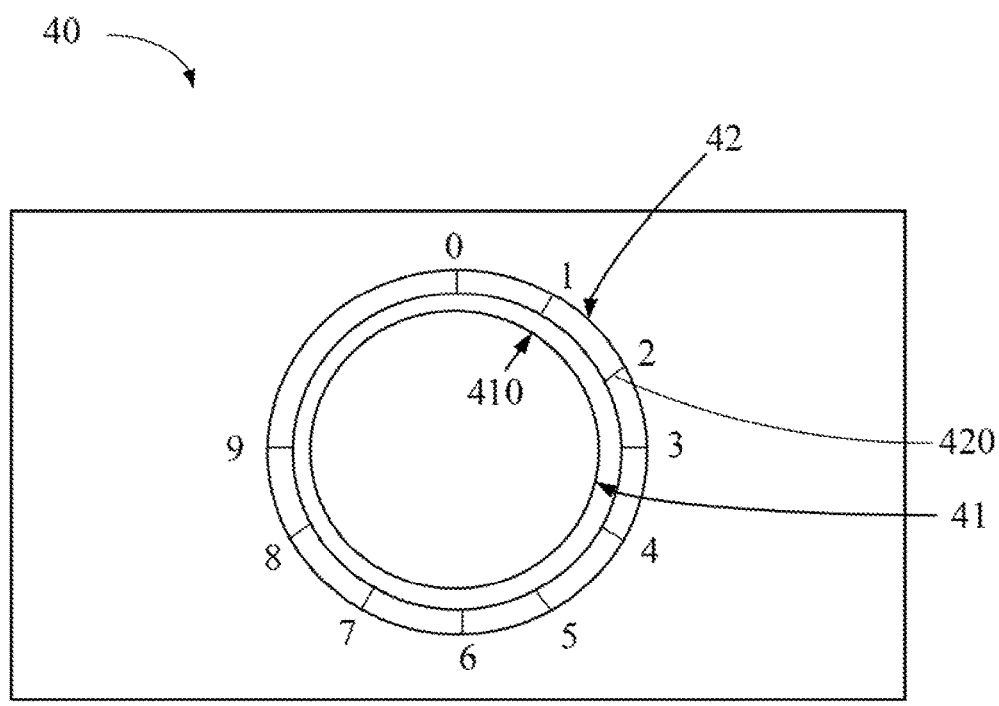
FIG. 2 is a diagrammatic view showing the input device of FIG. 1 under a first input mode.

In at least one exemplary embodiment, the input device 1 further comprises a display screen 40. The display screen 40 is positioned on the casing 10, and can display a first virtual icon 41 of the rotatable disk 20 and a second virtual icon 42 of the annular area 11, as shown in FIGS. 1 and 2. The first virtual icon 41 comprises a virtual pointer 410 corresponding to the pointer 22. The second virtual icon 42 surrounds the first virtual icon 41, and comprises a number of calibration lines 420 along a circumferential direction thereof. Each calibration line 420 indicates one character of the character set corresponding to the current input mode. When the user rotates the rotatable disk 20 until the pointer 22 is aligned with the input position 12 corresponding to the desired character, the processor 30 controls the first virtual icon 41 to simultaneously rotate until the virtual pointer 410 is aligned with a calibration lines 420 indicating the desired character. Thus, the user can operate the rotatable disk 20 more precisely by reference to the display screen 40.

In at least one exemplary embodiment, the input modes comprise a first input mode to input characters of a first character set, a second input mode to input characters of a second character set, and a third input mode to input characters of a third character set. The characters of the first character set comprise numbers. The characters of the second character set comprise capital letters. The characters of the third character set comprise lowercase letters. In other exemplary embodiments, the numbers of the input modes and the types of the first, the second, and the third character sets can be varied.

FIG. 2 illustrates that under the first input mode of the display screen 40 in FIG. 1, the annular area 11 comprises ten input positions 12 corresponding to numbers from "0" to "9". In at least one exemplary embodiment, the ten input positions 12 correspond to clockface points from zero o'clock point to nine o'clock point, which makes it more convenient for the user to input the desired character. That is, when the user wants to input the number "1", the user can rotate the rotatable disk 20 along the clockwise direction until the pointer 22 is aligned with the one o'clock point. In at least one exemplary embodiment, the rotatable disk 20 can rotate relative to the casing 10 both along the clockwise direction and the counterclockwise direction. The user can also input the number "1" when the user rotates the rotatable disk 20 along the counterclockwise direction.

In at least one exemplary embodiment, the switch button 21 is positioned on an area of the rotatable disk 20 from the nine o'clock point to the twelve o'clock point.

Figure 3:
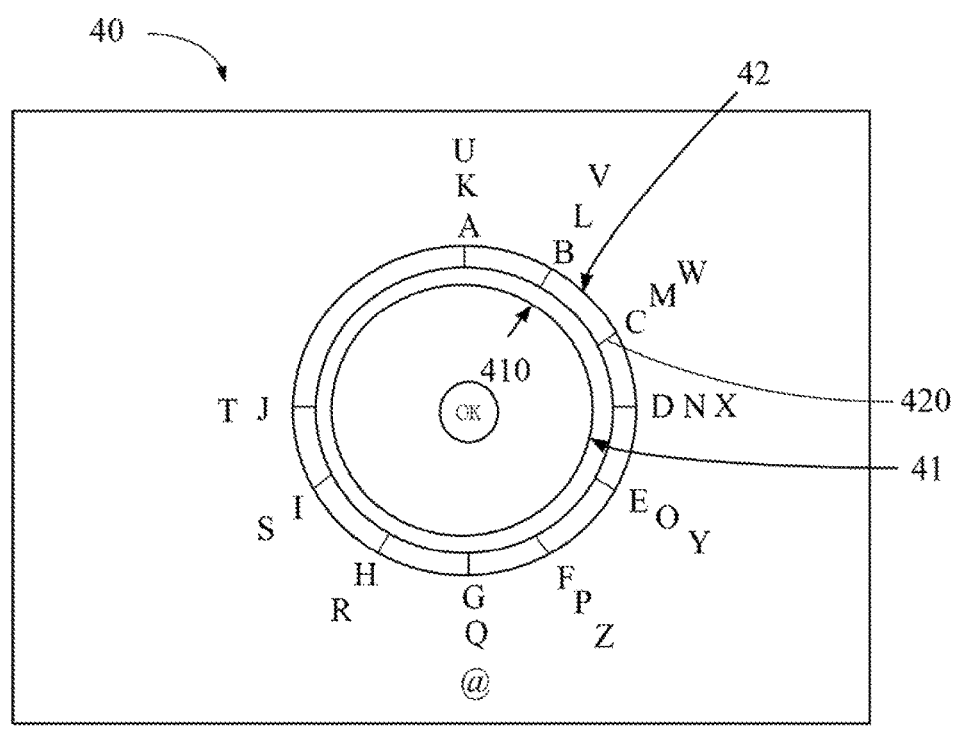
FIG. 3 is a diagrammatic view showing the input device of FIG. 1 under a second input mode.

FIG. 3 illustrates that under the second input mode of the display screen 40 in FIG. 1, the annular area 11 also comprises ten input positions 12 corresponding to the capital letters from "A" to "Z". In at least one exemplary embodiment, when the number of the input positions 12 is less than the number of the characters of the corresponding characters set, the characters are divided into at least two layers. For example, the capital letters from "A" to "Z" can be divided into three layers: a first layer comprising capital letters from "A" to "J", a second layer comprising capital letters from "K" to "T", and a third layer comprising capital letters from "U" to "Z". The elastic tab 111 is aligned with the pointer 22 at its original position. The elastic tab 111 is elastically deformed when the rotatable disk 20 rotates about 360 degrees, and generates a trigger signal. When the processor 30 receives the trigger signal for a first time, the processor 30 navigates the input positions 12 from capital letter of the first layer to capital letters of the second layer. For example, when the user wants to input capital letter "L", the user can rotate the rotatable disk 20 about 360 degrees to cause the elastic tab 111 to be elastically deformed. Then, the processor 30 navigates the input positions 12 to capital letters from "K" to "T" of the second layer. The user can further rotate the rotatable disk 20 along the clockwise direction until the pointer 22 is aligned with the input position 22 corresponding to the capital letter "L". In at least one exemplary embodiment, under the second input mode, the input positions 12 can further correspond to some symbols (e.g., ".", "-", and "_"), which are comprised in the third layer and are behind the capital letters from "U" to "Z".

Furthermore, the processor 30 further determines a rotating direction of the rotatable disk 20 before the processor 30 receives the trigger signal for the first time, and determines whether the rotatable disk 20 changes the rotating direction when the processor 30 receives the trigger signal for a next time. When the rotatable disk 20 does not change the rotating direction, the processor 30 navigates the input positions 12 to capital letters of the third layer. When the rotatable disk 20 changes the rotating direction, the processor 20 navigates the input positions 12 in reverse, to capital letters of the first layer. In at least one exemplary embodiment, the processor 30 determines the rotating direction according to the latest two capacitance values received. For example, the capacitance values corresponding to the input positions 12 along the clockwise direction gradually increase. Thus, when the processor 30 determines that the latest two capacitance values show an increase, the processor 30 can determine that the rotatable disk 20 rotates along the clockwise direction.

Figure 4:
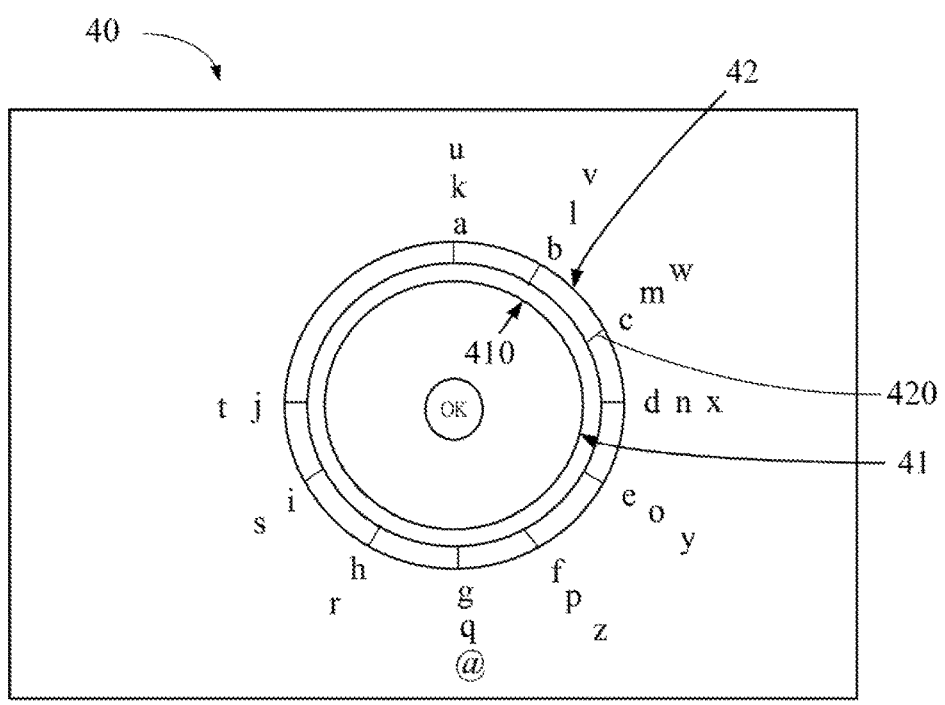
FIG. 4 is a diagrammatic view showing the input device of FIG. 1 under a third input mode.

FIG. 4 illustrates that under the third input mode of the display screen 40 in FIG. 1, the annular area 11 also comprises ten input positions corresponding to the lowercase letters from "a" to "z". The operation of the third input mode can be the same as that of the second input mode.

Figure 5:
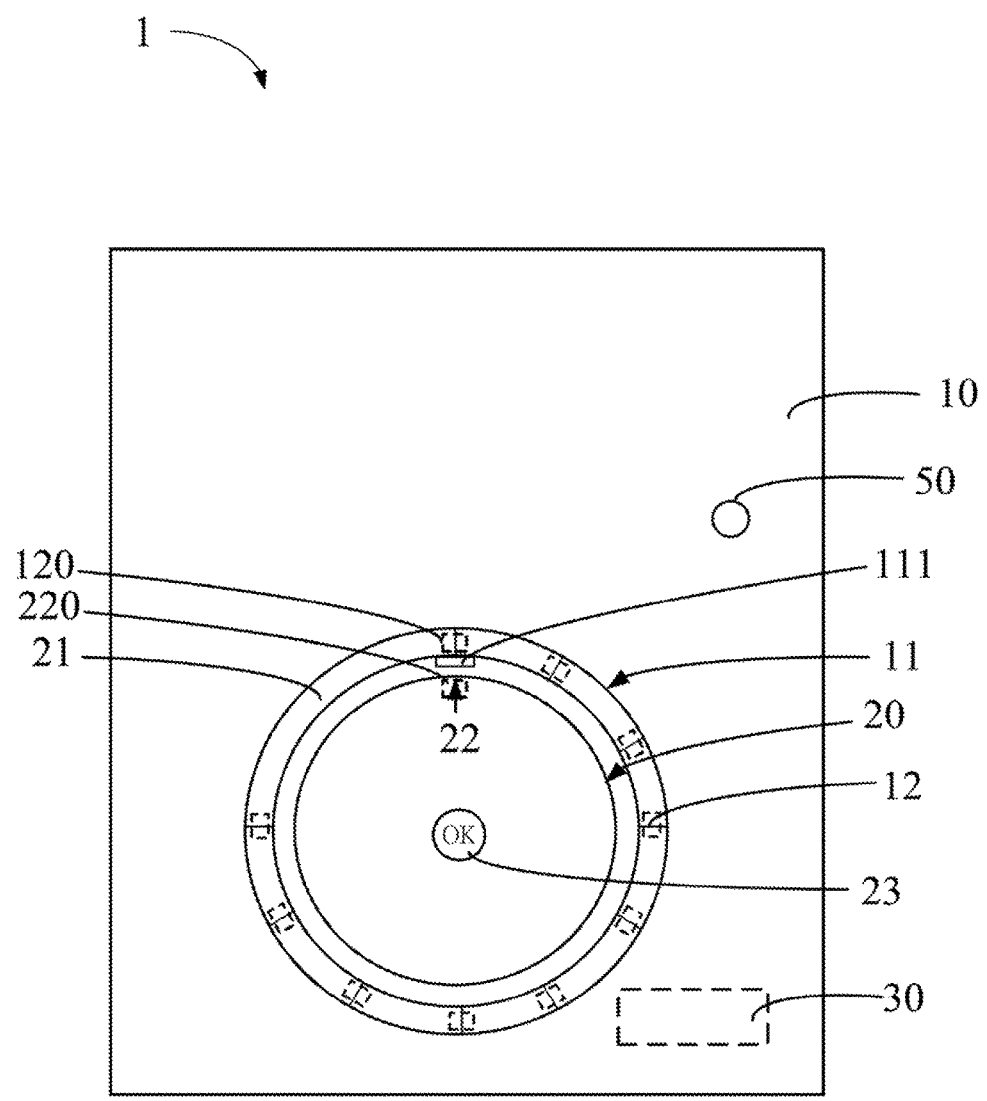
FIG. 5 is a diagrammatic view of another exemplary embodiment of an input device having a rotatable disk.

FIG. 5 illustrates that in another exemplary embodiment, with similar numerals representing similar features in FIG. 1, an input device 1 in FIG. 5 is substantially similar to the input device in FIG. 1, where the display screen 40 is replaced by an indicating lamp 50. The indicating lamp 50 is positioned on the casing 10 or the rotatable disk 20, and can emit light with different colors or intensities to indicate the current input mode of the rotatable disk 20. For example, the indicating lamp 50 can respectively emit red light, yellow light, or green light to indicate the first input mode, the second input mode, or the third input mode.

In at least one exemplary embodiment, the input modes can further comprise a fourth input mode. Under the fourth input mode, the user can press the up, down, left, and right areas, and a confirm button 23 of the rotatable disk 20, to input corresponding control signals. In at least one exemplary embodiment, the confirm button 23 is positioned at a center of the rotatable disk 20.

With the above configuration, the switch button 21 can switch the rotatable disk 20 among different input modes when operated, thereby allowing the user to input characters of different character sets. Thereby, the number of mechanical buttons is decreased, which can reduce the size and improve the appearance of the input device 1.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An input device comprising:
a casing comprising an annular area;
a rotatable disk capable of rotating relative to the casing and surrounded by the annular area, the rotatable disk having a plurality of input modes for inputting characters of a plurality of character sets, the rotatable disk comprising a switch button for switching among the plurality of input modes, the rotatable disk further comprising a pointer; and
a processor received in the casing;
wherein the annular area has a plurality of input positions along a circumferential direction thereof, the plurality of input positions corresponds to characters of one of the plurality of character sets corresponding to a current input mode of the rotatable disk;

wherein the processor is configured to generate a control signal according to a character corresponding to an input position when the pointer is aligned with the input position;

wherein the rotatable disk comprises a first capacitor plate at the pointer, the annular area comprises a second capacitor plate at each of the plurality of input positions, the first capacitor plate and the second capacitor plate cooperatively generate a capacitance having a certain capacitance value each time the pointer is aligned with one input position, each of the plurality of input positions corresponding to one capacitance value, when the processor detects a capacitance value, the processor determines which input position is aligned with the pointer according to the detected capacitance value.

2. The input device of claim 1, wherein the rotatable disk generates a confirm signal when the pointer is pressed, and the processor generates the control signal when receiving the confirm signal.

3. The input device of claim 1, wherein the processor determines that the rotatable disk generates a confirm signal when detecting the capacitance value decreasing to zero, and generates the control signal when receiving the confirm signal.

4. The input device of claim 1, further comprising a display screen positioned on the casing, wherein the display screen display a first virtual icon of the rotatable disk and a second virtual icon of the annular area, the first virtual icon comprises a virtual pointer corresponding to the pointer, the second virtual icon surrounds the first virtual icon, and comprises a plurality of calibration lines along a circumferential direction thereof, each of the plurality of calibration lines indicates one character of the character set corresponding to the current input mode, when the rotatable disk rotates until the pointer is aligned with the input position corresponding to a character, the processor controls the first virtual icon to simultaneously rotate until the virtual pointer is aligned with a calibration lines indicating the character.

5. The input device of claim 1, wherein the plurality of input modes comprises a first input mode to input characters of a first character set, a second input mode to input characters of a second character set, and a third input mode to input characters of a third character set, the characters of the first character set comprise numbers, the characters of the second character set comprise capital letters, and the characters of the third character set comprise lowercase letters.

6. The input device of claim 5, wherein under the first input mode, the annular area comprises ten input positions corresponding to numbers from "0" to "9", and the ten input positions correspond to clockface points from zero o'clock point to nine o'clock point.

7. The input device of claim 6, wherein the switch button is positioned on an area of the rotatable disk from the nine o'clock point to a twelve o'clock point.

8. The input device of claim 6, wherein under the second input mode, the annular area comprises ten input positions corresponding to the capital letters from "A" to "Z", the capital letters from "A" to "Z" are divided into a plurality of layers, the annular area comprises an elastic tab which is aligned with the pointer at its original position, the elastic tab is elastically deformed when the rotatable disk rotates about 360 degrees, and generates a trigger signal, when the processor receives the trigger signal for a first time, the processor navigates the input positions to capital letters of a next layer.

9. The input device of claim 8, wherein the processor further determines a rotating direction of the rotatable disk before the processor receives the trigger signal for the first time, and determines whether the rotatable disk changes the rotating direction when the processor receives the trigger signal for a next time, the processor navigates the input positions to capital letters of yet another next layer when the rotatable disk does not change the rotating direction, and navigates the input positions in reverse to capital letters of a previous layer when the rotatable disk changes the rotating direction.

10. The input device of claim 5, wherein under the third input mode, the annular area comprises ten input positions corresponding to the lowercase letters from "a" to "z", the lowercase letters from "a" to "z" are divided into a plurality of layers, the annular area comprises an elastic tab which is aligned with the pointer at its original position, the elastic tab is elastically deformed when the rotatable disk rotates about 360 degrees, and generates a trigger signal, when the processor receives the trigger signal for a first time, the processor navigates the input positions to lowercase letters of a next layer.

11. The input device of claim 1, further comprising an indicating lamp, wherein the indicating lamp emits light to indicate the current input mode.

* * * * *